Figures 1, 2:
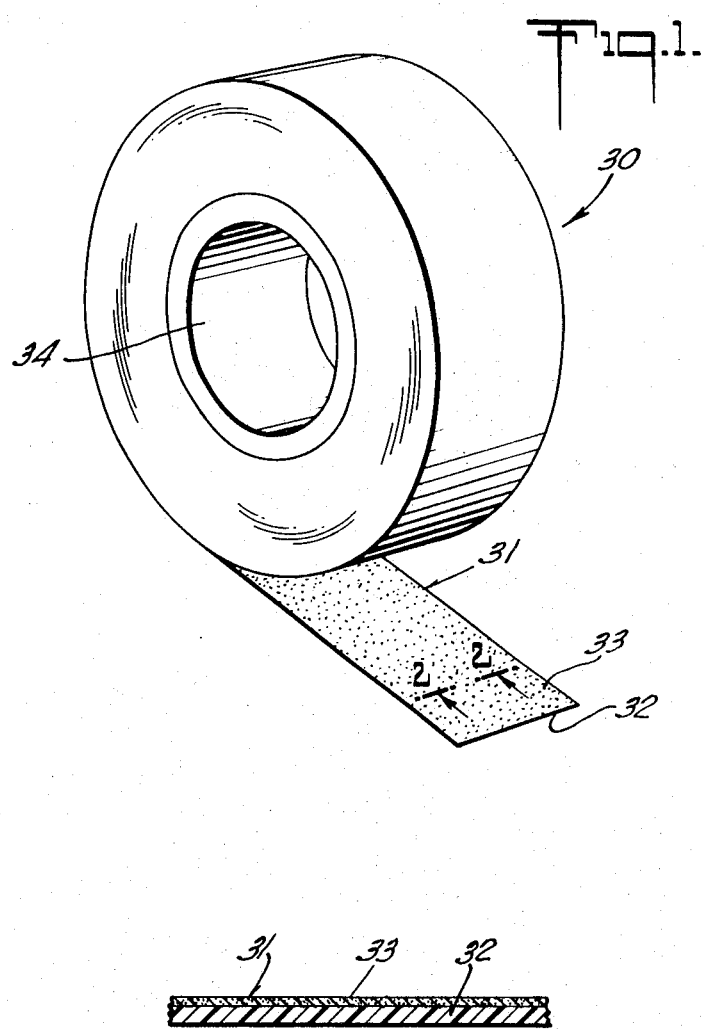

United States Patent

[11] 3,625,752

[72] Inventor Ralf Korpman
 East Brunswick, N.J.
[21] Appl. No. 864,334
[22] Filed Oct. 7, 1969
[45] Patented Dec. 7, 1971
[73] Assignee Johnson & Johnson
 Continuation-in-part of application Ser. No. 720,811, Apr. 12, 1968, now abandoned, Continuation-in-part of application Ser. No. 720,955, Apr. 12, 1968, now abandoned. This application Oct. 7, 1969, Ser. No. 864,334

[54] PRECURED ADHESIVE TAPE
 7 Claims, 2 Drawing Figs.
[52] U.S. Cl. ................................................ 117/122 P,
 117/76 A, 117/68.5, 117/93.3, 117/122 PA,
 117/161 UD, 260/29, 260/829, 260/876 B
[51] Int. Cl. ................................................ C09j 7/02
[50] Field of Search ................................................ 117/122 P,
 122 PA, 76 H, 161 UD, 93.3, 68.5; 260/876 B, 29,
 829

[56] References Cited
 UNITED STATES PATENTS
3,231,635 1/1966 Holden et al. ............... 280/880
3,325,430 6/1967 Grasley ........................ 260/25
3,239,478 3/1966 Harlan .......................... 260/27
3,352,944 11/1967 Wheat .......................... 260/876
3,380,863 4/1968 Silverberg ................... 117/161 X
3,458,600 7/1969 Mann ........................... 117/161 X
3,464,850 9/1969 Haefele ........................ 117/161 X
3,165,496 1/1965 Fusco et al. ................... 260/55 X Primary Examiner—William D. Martin
Assistant Examiner—Bernard D. Pianalto
Attorneys—Charles A. Harris and Robert L. Minier ABSTRACT: A precured pressure-sensitive adhesive tape possessing superior high-temperature properties over a wider range of curing conditions than normally employed. This tape is based on a diene adhesive wherein a major proportion by weight of the elastomers is an elastomeric and thermoplastic block polymer of the structure ABA, wherein A is a thermoplastic polymer block of a vinyl arene with a glass transition temperature above normal room temperature and B is an elastomeric polymer block of isoprene. The elastomers are combined with a tackifier and a curing agent, coated on a backing to form a tape, and then cured in situ to provide a precured adhesive tape having the desired range of high-temperature properties.

PATENTED DEC 7 1971 3,625,752

INVENTOR
RALF KORPMAN
BY
Charles A. Harris
ATTORNEY

PRECURED ADHESIVE TAPE

This application is a continuation-in-part of my copending applications Ser. No. 720,811, and now abandoned, and Ser. No. 720,955, and now abandoned, both filed Apr. 12, 1968.

The present invention relates to precured pressure-sensitive adhesive tapes particularly adapted for high-temperature performance.

Conventional pressure-sensitive tapes normally are based on adhesives made from elastomers such as natural or synthetic polyisoprene, butadiene-styrene (SBR) polymers, or the like, and appropriate tackifying resins combined with fillers, antioxidants, etc. These adhesives are suitable at room temperature but do not perform satisfactorily at high temperatures. The adhesive rapidly loses its internal strength and adhesion, resulting in adhesive splitting and mass deposit, when the tape is subjected to elevated temperatures such as exist when a masked automobile is sent through a heated drying tunnel.

To overcome this defect, it has been suggested that the adhesive be precured in situ after it has been coated on the tape backing, in order to overcome the thermoplasticity of the rubber. U.S. Pat. No. 2,999,769, describes one approach to the problem of obtaining a tape with good quickstick, adhesion and resistance to mass deposit at elevated temperatures. Unfortunately, performance of this adhesive and all similar adhesives is very sensitive to the state of cure. If the adhesive in undercured, adhesive splitting and deposit results. If the adhesive is even slightly overcured, quickstick and high-temperature hold suffer. Therefore, extremely close monitoring of the equipment and process is necessary to produce a good performing tape.

The tape of my invention also is precured. Surprisingly, however, my tape has two distinct advantages over the prior art referred to, i.e.:

1. It possesses superior high-temperature hold properties, and
2. Its high-temperature properties are satisfactory over a wide range of cures and therefore are relatively insensitive to the exact state of the cure achieved.

Thus, it may be satisfactorily cured over a relatively wide range of times and temperatures to provide superior high-quality, high-temperature tapes without the need for very precise monitoring of the curing process. These high-temperature properties are attained in tapes of my invention while still providing a good balance of room or normal ambient temperature properties.

I have found that these qualities may be achieved by utilizing a normally tacky and pressure-sensitive adhesive composition wherein a major proportion by weight of the elastomers is an elastomeric and thermoplastic block polymer of the structure ABA, wherein A is a thermoplastic polymer block of a vinyl arene with a glass transition temperature above normal room temperature and B is an elastomeric polymer block of isoprene. The elastomer or elastomers are combined with a suitable tackifier and a diene elastomer reactive heat curing agent, coated on the tape backing and cured in situ to produce the tape of my invention.

The block polymer ABA, useful in this invention, consists of a polymer block B polymerized from isoprene, either alone or in conjunction with other monomers. The thermoplastic blocks A preferably are polymerized from styrene or styrene homologues and exhibit a glass transition above normal room temperature, say above about 25° C. and preferably above 50° C. The A blocks have a molecular weight of at least about 7,000 and furthermore constitute about 8-35 percent and preferably about 10-20 percent of the total polymer as indicated hereinbefore. The above described ABA block polymer may be used as the sole elastomeric constituent of the adhesive, and it is preferred that the elastomers consist essentially of this type of block polymer. However, the adhesive may include a minor amount by weight of the total elastomers of an additional more conventional diene elastomer such as natural rubber, or polymers based on butadiene, isoprene, butadiene-styrene (SBR rubber), butadiene-acrylonitrile (NBR rubber), butyl rubber, or the like, and also may include other block polymers based on such diene elastomers. When the term "total elastomers" is used herein it shall mean the aggregate of the elastomeric and thermoplastic block polymer and the additional diene elastomer.

Any of the conventional tackifiers or mixtures thereof may be used. This includes rosins and rosin derivatives, polyterpenes, coumarone-indene resins, phenolic or maleic modified resins, and hydrocarbon resins. The amount of tackifier may range broadly from about 25 to 150 parts per hundred parts of the total elastomers and preferably about 40-85 parts. Frequently, a mixture of resins may provide a better balance of properties than any one resin alone. When the term "parts" is used hereinafter, it shall mean parts per hundred parts of the total elastomers unless indicated otherwise.

Any conventional diene elastomer curing system may be employed, although it is preferred to use an oil-soluble heat reactive aldehyde resin as the curing agent. To obtain the best balance of properties, I suggest the use of about 2 to 35 parts of the aldehyde resin and preferably about 7 to 20 parts, although under some circumstances as high as 50 parts may be used. Conventional accelerators such as zinc resinate or alkaline fillers may be used, as may acid accelerators such as disclosed in U.S. Pat. No. 3,231,419. Zinc resinate is preferably used in amounts less than 30 parts in order to retain sufficient tack.

Other conventional additives may be used in the adhesive. Antioxidants and heat stabilizers should be used for best heat stability. 2,5 ditertiary amyl hydroquinone, tertiary butyl cresol, and amine-type antioxidants are usually employed. The zinc salts of the alkyl dithiocarbamates are frequently used as heat stabilizers. Ultraviolet absorbers also may be added to the adhesive when improved outdoor weathering is required.

Conventional pigments and fillers such as zinc oxide, aluminum hydrate, carbon black, clay, calcium carbonate and others may be used to extend the adhesive and alter its appearance. Colored pigments may be used when a colored adhesive is desired.

Summarizing, in terms of properties, the adhesive tape of this invention possesses a good balance of room temperature properties such as high-quickstick and adhesion combined with excellent high-temperature properties such as resistance to splitting, adhesion, and hold over a wide range of temperatures and conditions. In addition, this tape retains its properties and ages well and does not distort or buckle when stored at elevated temperatures for extended period of times in warehouses or elsewhere.

Another advantage of the adhesive of this invention is that it may be formulated and coated at relatively high solids to provide a very smooth outer adhesive surface to the tape.

Other and further advantages of this invention will appear to one skilled in the art from the following description, examples and claims; taken together with the drawings wherein:

FIG. 1 is a view in perspective of a roll of tape according to one embodiment of the invention;

and FIG. 2 is a greatly enlarged sectional view taken along the line 2–2 of FIG. 1.

Referring to the drawings, there is shown a roll 30 of pressure-sensitive adhesive tape 31, according to one embodiment of this invention, which comprises a flexible backing sheet 32 and a layer of pressure-sensitive adhesive 33 coated on one major surface of said backing. The tape 31 normally is wound upon itself around a core 34 with the adhesive side of the tape facing inwardly toward the core. The backing sheet 32 may be a plastic film, paper or any other suitable material and the tape may include various other layers or coatings, such as primers, release coatings, and the like, which are used in the manufacture of pressure-sensitive adhesive tapes.

The following examples are given only by way of illustration and are not intended to limit the scope of the present invention in any way. In the examples all proportions are given in parts per one hundred parts of the total elastomers unless otherwise indicated. Adhesives for tapes according to this invention are formulated as indicated in the following table A:

TABLE A

| Example | I | II | III | IV | V | VI | VII | VIII | IX |
|---|---|---|---|---|---|---|---|---|---|
| Block Polymer A (Kraton 107) | 100 | 100 | 100 | | | 100 | 100 | 50 | 70 |
| Block Polymer B | | | | 100 | | | | | |
| Block Polymer C | | | | | 100 | | | | |
| Pale crepe rubber | | | | | | | | 50 | |
| Natsyn 410 rubber | | | | | | | | | 30 |
| Wingtack 95 tackifier | | 50 | | 50 | 50 | 65 | | 75 | 75 |
| Piccolyte S 115 tackifier | 50 | | | | | | | | |
| Super Sta-Tac tackifier | | | | | | | 50 | | |
| Stabelite ester No. 10 tackifier | | | 50 | | | | | | |
| Amberol ST 137 curing resin | 7 | 20 | 20 | 20 | 20 | 10 | 12 | 15 | 15 |
| Schenectady 1056 curing resin | | | | | | 7.5 | | | |
| Zinc resinate | 7 | 10 | 10 | 10 | 10 | 5 | 10 | 12 | 12 |
| 2,5-ditertiary-amyl-hydroquinone | 1 | 1 | 1 | 1 | 1 | 1 | 1 | 1 | 1 |
| Zinc dibutyl-dithiocarbamate | 2 | 2 | 2 | 2 | 2 | 2 | 2 | 2 | 2 |
| Percent solids in toluene | 50 | 50 | 50 | 50 | 50 | 50 | 50 | 30 | 30 |

The adhesive formulation of Example I is coated at approximately 1.7 ounces per square yard, dry weight, on a conventional impregnated and backsized creped masking tape backing and then dried and cured for approximately 4 minutes at 300° F. The cured product then is slit into tapes approximately 1 inch wide. The resulting tapes possess good tack and have a peel adhesion of approximately 50 ounces when measured by the standard P.S.T.C. 1 test method. High-temperature hold then is measured by the following test. Strips of 1 inch tape are applied to the mirror-smooth surface of a phtographer's chrome Ferrotype plate with the types parallel to the edge of the panel. The tapes extend beyond the lower edge of the panel to serve as tabs on which to hang weights. The test panel is placed in a holder which supports the panel at an angle of 20° from the vertical position. The panel is placed in the holder in such a way that the tabs are at the bottom of the panel and the tape is capable of being stripped from the panel at a 20° angle when a weight is applied. The panel in the holder is placed in an air circulating oven at a temperature of 200° F. and a 1,000 gram weight is attached to the tab of each strip of tape. The rate at which the tape is stripped from the panel is measured. Calculations are made as follows:

$$R = \text{rate of stripping} = \frac{\text{distance stripped in millimeters}}{\text{time of stripping in minutes}}$$

$$H = \text{hold value} = 100/R$$

The hold value H for the tape of this example is well over 1,000 when tested at 200° F. This indicates excellent and unusual physical properties at this temperature level. For instance, normal commercial high-temperature masking tapes, now available, average about 0.5 to 2.5 in hold value when tested as described above.

The formulations of examples II–IX all are coated on creped paper backings of the type described in example I at about 1.5 ounces per square yard, dry weight, and then dried, cured and made into tapes as described in that example. The resulting tapes possess good tack and peel adhesion and give high-temperature hold values in a different order of magnitude from those of the prior art tapes, i.e., normally at least about 10 times the prior art values, when measured as described in example I. The preferred tapes of this invention normally give high-temperature hold values of at least about 100 when tested in this manner, although the mixed elastomer tapes of examples VIII and IX may give hold values as low as 10 or 20.

When the tapes of the foregoing examples are wound upon themselves in the form of a roll with their adhesive sides facing inwardly in the normal manner, the resulting rolls of tape retain their properties and age well and do not distort or buckle when stored at elevated temperatures for extended periods of time.

In the foregoing examples, Kraton 107 (Block Polymer A) is an elastomeric and thermoplastic styrene-isoprene ABA block polymer sold by the Shell Chemical Company. This polymer is believed to have a styrene content of about 12–15 percent, i.e., closer to 15 percent, a solution viscosity of 2,900 c.p.s. and a number average molecular weight of about 110,000–125,000. Whenever solution viscosity is mentioned in this application, it refers to viscosity measured at 23° c. in a toluene solution at a solids content of about 25 percent. Block polymers B and C are similar elastomeric and thermoplastic styrene-isoprene ABA block polymers. However, block polymer B has a styrene content of about 10 percent and a number average molecular weight of about 160,000, whereas block polymer C has a styrene content of about 20 percent and a number average molecular weight of about 130,000. Natsyn 410 Rubber is synthetic polyisoprene rubber sold commercially by the Chemical Division of the Goodyear Tire and Rubber Company. This rubber has a Mooney Viscosity at 212° F. of 50+5 units.

Wingtack 95 is a synthetic tackifier resin believed to have been polymerized mainly from a mixture of piperylene and isoprene and which possesses a melting point of about 95° C. It is offered commercially by Goodyear Tire and Rubber Company. Piccolyte S–115 is a terpene resin polymer of beta pinene sold commercially by the Harwick Standard Chemical Company. Super Sta-Tac is a tackifier resin offered by Reichold Chemicals, Inc. and is believed to have been polymerized from a dimerized stream of aliphatic monomers consisting predominantly of piperylene and isoprene, together with a minor proportion of styrene. Stabelite Ester No. 10 is a glycerol ester of hydrogenated rosin sold by Hercules, Inc.

Amberol ST 137 is an oil-soluble elastomer-reactive heat-curing octyl phenol formaldehyde resin. It has a melting point of approximately 80° C. and is sold commercially by the Rohm and Haas Company. Schenectady 1056 is a similar but more reactive bromo-methylated heat curing phenol formaldehyde resin of the type generally described in U.S. Pat. No. 3,165,496 and offered commercially by Schenectady Chemicals Inc.

Having now described the invention is specific detail and exemplified the manner in which it may be carried into practice, it will be readily apparent to those skilled in the art that innumerable variations, applications, modifications, and extensions of the basic principles involved may be made without departing from its spirit or scope.

What is claimed is:

1. A pressure-sensitive adhesive tape which comprises a flexible backing elastomers and a cured layer of a normally tacky and pressure-sensitive adhesive coated on one major surface of said sheet; said adhesive comprising a major proportion by weight of the total elastomers of an elastomeric and thermoplastic block polymer of the structure A-B-A, wherein A is a thermoplastic polymer block of a vinyl arene and possesses a glass transition temperature above normal room temperature and B is an elastomeric polymer block of isoprene, said thermoplastic A blocks composing about 8–35 percent by weight of the block polymer; about 25–150 parts per 100 parts by weight of the total elastomers of a tackifier resin for said elastomers; and about 2–50 parts per 100 parts by weight of the total elastomers of a diene elastomer reactive curing agent for said adhesive.

2. A pressure-sensitive adhesive tape according to claim 1, wherein the tackifier is present in the amount of about 40–85 parts per 100 parts by weight of the total elastomers.

3. A pressure-sensitive adhesive tape according to claim 1, wherein the vinyl arene is styrene.

4. A pressure-sensitive adhesive tape according to claim 1, wherein the A blocks compose about 10–20 percent by weight of the block polymer.

5. A pressure-sensitive adhesive tape according to claim 1, wherein the curing agent is present in the amount of about 2–35 parts per 100 parts by weight of the total elastomers.

6. A pressure-sensitive adhesive tape according to claim 5, wherein the curing agent is present in the amount of about 7–20 parts per 100 parts by weight of the total elastomers.

7. A pressure-sensitive adhesive tape according to claim 1, wherein the total elastomers in said adhesive consist essentially of said elastomeric and thermoplastic block polymer.

* * * * *

PO-1050
(5/69)

UNITED STATES PATENT OFFICE
CERTIFICATE OF CORRECTION

Patent No. 3,625,752                    Dated   December 7, 1971

Inventor(s)   Ralf Korpman

It is certified that error appears in the above-identified patent and that said Letters Patent are hereby corrected as shown below:

In Column 4, line 56, " a flexible backing elastomers "
should read ---- a flexible backing sheet ----.

Signed and sealed this 23rd day of January 1973.

(SEAL)
Attest:

EDWARD M. FLETCHER, JR.                ROBERT GOTTSCHALK
Attesting Officer                      Commissioner of Patents